United States Patent [19]

Whitebay

[11] Patent Number: 5,072,791
[45] Date of Patent: Dec. 17, 1991

[54] METHOD OF STABILIZING FORMATION PRIOR TO GRAVEL PACKING

[75] Inventor: Lee E. Whitebay, Ponca City, Okla.

[73] Assignee: Conoco Inc., Ponca City, Okla.

[21] Appl. No.: 592,417

[22] Filed: Oct. 3, 1990

[51] Int. Cl.$^5$ .............................................. E21B 43/04
[52] U.S. Cl. .................................... 166/278; 166/294; 166/300
[58] Field of Search ............... 166/274, 270, 276, 278, 166/285, 293, 294, 300; 252/8.551

[56] References Cited

U.S. PATENT DOCUMENTS

| | | | |
|---|---|---|---|
| 4,558,741 | 12/1985 | Borchardt et al. | 166/294 |
| 4,660,640 | 4/1987 | Hoskin et al. | 166/270 |
| 4,693,639 | 9/1987 | Hollenbeak et al. | 166/294 |
| 4,735,265 | 4/1988 | Hoskin et al. | 166/294 |
| 4,785,883 | 11/1988 | Hoskin et al. | 166/270 |
| 4,787,453 | 11/1988 | Aewgill et al. | 166/294 |

FOREIGN PATENT DOCUMENTS 0333458 9/1989 European Pat. Off. .

*Primary Examiner*—Bruce M. Kisliuk

[57] ABSTRACT

A method of stabilizing perforations in a silty formation prior to gravel packing. The perforations are contacted with a polymer/salt composition as or shortly after they are formed.

8 Claims, No Drawings

METHOD OF STABILIZING FORMATION PRIOR TO GRAVEL PACKING

BACKGROUND OF THE INVENTION

1. Field of the Invention

This invention relates to a method of stabilizing perforations in a potentially hydrocarbon-producing subterranean formation, particularly in a formation containing fine silt particles which, if not stabilized in place, cause operating problems during production of hydrocarbons from the formation. More particularly, the invention relates to such a method wherein a particular stabilizing fluid is used to stabilize the fine silt particles in the formation, especially in or about perforations in the formation.

2. The Prior Art

U.S. Pat. Nos. 4,660,640, 4,735,265, and 4,785,883 all disclose compositions comprised of polyvinyl alcohol and alkali metal silicate for use in controlling permeability in secondary recovery operations. These references do not suggest using the compositions to stabilize fine silt particles in and around perforations in a gravel-packed producing well.

European Patent Application 89302558.5 describes shale-stabilizing drilling fluid additives which are similar in many respects to the silt stabilizing materials useful in carrying out the process of the present invention.

SUMMARY OF THE INVENTION

According to the present invention, unconsolidated sand formations, particularly those containing a significant amount of very fine siliceous material (silt), are consolidated prior to gravel pack completing of wells extending into such formations. More particularly, perforation tunnels extending into such formations are consolidated prior to gravel packing of the well and its associated perforation tunnels. The perforation tunnels are consolidated by contacting the surface and near-surface areas thereof with a stabilizing fluid having specified properties and composition.

The stabilizing fluids useful in carrying out the process of the invention consist essentially of one or more water-soluble polymers combined with one or more alkaline potassium salts in wide-ranging ratios effective to give a composition having a pH of at least 9. The water-soluble polymer or polymers useful in this invention are of relatively high molecular weight and are capable of forming nucleophilic sites when treated with a base. The potassium salt or salts are those whose anions are relatively strong Bronsted-Lowry bases, i.e., give a pH of 9 or above in the presence of an aqueous solution of the polymer, but are relatively weak nucleophiles compared to the nucleophilic sites on the polymer.

DESCRIPTION OF THE PREFERRED EMBODIMENTS

The most preferred embodiment of the invention involves stabilizing perforation tunnels in loose or unconsolidated potentially hydrocarbon-producing formations which are penetrated by a cased and cemented wellbore. Such wellbores are conventionally perforated to provide flow passages from the formation into a production tubing extending to the surface. In formations which are unstable or which tend to produce fine solids along with hydrocarbon fluids, it is a common practice to gravel-pack the well prior to putting it into production. Gravel packing is a known and established method of sand control in which small gravel particles are packed into a wellbore adjacent a producing formation and outside of a production tubing which has a screen or slots formed therein to allow passage of produced fluids. The openings in the production tubing are sized to prevent the gravel from entering the tubing. The gravel size is selected to prevent formation solids from entering the gravel pack.

The process of the invention is intended to stabilize the perforation tunnels as they are formed so that the tunnels remain open and free of fine sand and silt during the time interval between formation of the perforation tunnels and packing of the tunnels with gravel.

This is accomplished by contacting the perforation tunnels with a stabilizing fluid immediately upon formation of the tunnels. The stabilizing fluid may be placed in the well opposite the formation to be perforated, and as the perforation tunnels are formed, the stabilizing fluid, preferably maintained at a pressure slightly above formation pressure, immediately contacts the surface and near surface areas of the perforation tunnels and stabilizes the tunnels until they can be filled with gravel.

THE STABILIZING FLUID

The stabilizing fluids useful in the present invention consist essentially of one or more water-soluble polymers combined with one or more alkaline potassium salts in wide-ranging ratios effective to give a composition having a pH of at least 9. The water-soluble polymer or polymers of this invention are of relatively high molecular weight and are capable of forming nucleophilic sites when treated with a base. The potassium salt or salts are those whose anions are relatively strong Bronsted-Lowry bases; i.e., give a pH of 9 or above in the presence of an aqueous solution of the polymer, but are relatively weak nucleophiles compared to the nucleophilic sites on the polymer.

The weight ratio of polymer:potassium salt should generally be in the range between about 1:20 and about 3:1. A generally preferred ratio is one in the range between about 1:2 and about 2:1. The polymer/potassium salt composition should be used in a concentration sufficient to effect consolidation of the perforation tunnels. The upper limit on the polymer/salt content of the fluid is one of practicality. Usually the polymer/salt composition is added to the fluid at a level between about 0.01 weight percent and 10.0 weight percent (based on the weight of the aqueous phase), typically between about 0.1 and about 4.0 weight percent, and preferably between about 0.3 and about 2.0 weight percent.

The polymers useful for the purposes of this invention must be:

a. water-soluble, b. capable of forming several nucleophilic sites within the same molecule when treated with bases, and c. of relatively high molecular weight.

Water-solubility of the polymers of this invention affords compatibility with formation water and timely intimate contact with newly formed perforation tunnel surfaces when in use. The polymers of this invention must not only be water-soluble but they should also have good wetting properties and a reasonable rate of dissolution in water for convenient use in the field. They should also afford aqueous solutions of low to moderate viscosities.

The polymers useful in this invention must be polyfunctional and be capable of forming relatively strong nucleophilic sites when treated with bases, particularly in comparison with the potassium salts used in the fluids.

The polymers useful in this invention must have a relatively high molecular weight. While the exact molecular weights will vary from polymer to polymer, it is a parameter that can be determined empirically. Partially hydrolyzed polymeric vinylacetate (PHPVA) having a number average molecular weight ($M_n$) of about 46,000 or below, represented by ELVANOL 90-50 or ELVANOL 71-30, while giving some stabilizing effect, is substantially less effective than those of higher molecular weight. ELVANOL HV partially hydrolyzed vinyl acetate homopolymer, $M_n$ of about 75,000, used as is or crosslinked with glutaraldehyde to increase the $M_n$ to about 190,000, is more effective. The ELVANOL products referred to herein are available from E. I. du Pont de Nemours and Company.

The polymers of choice for purposes of the invention are partially hydrolyzed polymeric vinyl acetate (PHPVA) homo- and copolymers. In general, the homopolymers should be at least 75 mol percent hydrolyzed to the corresponding polyvinyl alcohols and have an $M_n$ of 50,000 or more. In practice, the vinyl acetate homopolymer can be hydrolyzed to about 98 to 99 percent. However, as that upper practical limit is approached, the polymer becomes more crystalline and, as a consequence, less soluble in water, requiring heat to dissolve it. PHPVA which is about 87 or higher mol percent hydrolyzed is the most soluble in water. The only constraint on molecular weight is water-solubility. In a preferred embodiment, a vinyl acetate homopolymer having an Mn od 85,000 and which has been hydrolyzed about 87 percent is used.

In another preferred embodiment, a vinyl acetate copolymer is used. In the latter embodiment, the vinyl acetate portion of the copolymer can be hydrolyzed as fully as possible (about 98 to 99 percent) without loss of water-solubility. The presence of copolymer units derived from monomers other than vinyl acetate inhibits crystallization and thereby promotes water-solubility. Representative comonomers include acrylic and methacrylic acid, amides such as acrylamide and methacrylamide, and alkyl methacrylonitrile and acrylonitrile. The amount of the comonomer used with vinyl acetate will vary with the identity of the comonomer. However, that amount can be determined empirically by using enough to provide the degree of water-solubility desired in the copolymer. For example, vinyl acetate copolymers can be prepared from the preferred comonomer, acrylic acid, using monomer mixtures containing 14 to 39 mol percent (preferably 20 to 35 mol percent) acrylic acid.

Other polymers suitable for the purposes of this invention include partially (about 30 percent) hydrolyzed polyacrylamide which also contains potassium chloride, carboxymethyl hydroxyethyl celluloses with $M_n$ of between about 350,000 and 500,000; hydroxyethyl cellulose having an $M_n$ of about 200,000; hydroxypropyl methyl celluloses having an $M_n$ of from about 300,000 to 1,000,000; and hydroxy-propyl guar having an $M_n$ of about 600,000.

One or more potassium salts are used with the polymers in the process of this invention. The anions of the potassium salts must be relatively strong Bronsted-Lowry bases, but they should be relatively weak nucleophiles in comparison with the nucleophilic sites on the polymers. The potassium salts should be sufficiently alkaline so as to raise the pH to above 9.0 and to buffer it, at least temporarily, at a pH of at least 9.0; a pH range of 9.0 to 13.0 is suitable, with a pH range of 10.5 to 11.5 being preferred. It is technically feasible to operate at pH values between 11.5 and 13.0; however, such high pH values are somewhat less acceptable with respect to exposure of personnel in the field. A number of inorganic salts are suitable for use in conjunction with the polymers. Potassium silicate, potassium carbonate, and tribasic potassium phosphate may be used. The anions of these salts are all fairly strong Bronsted-Lowry bases and fairly weak nucleophiles.

Potassium silicates can be obtained commercially in a variety of $SiO_2$ to $K_2O$ ratios. Those having a $SiO_2/K_2O$ ratio in the range of about 0.5 to 2.5 are suitable for use in the present invention. However, the range of about 1.5 and 2.2 is preferred. When potassium silicates in the preferred range are included, the resultant fluids are very effective. Moreover, these types of potassium silicates are not expensive and do not tend to absorb moisture during storage or handling.

Water-soluble, partially hydrolyzed polyvinyl acetate (PHPVA) combined with potassium silicate, with or without another alkaline potassium salt, is used in a preferred embodiment of the present invention. In general, a composition within that embodiment will contain by weight about 20 to 100 parts of PHPVA, about 25 to 90 parts of potassium silicate, and 0 to about 90 parts of another alkaline potassium salt, such as potassium carbonate. A more preferred composition will contain about 40 to 70 parts of PHPVA, about 20 to 50 parts of potassium silicate, and about 10 to 40 parts of potassium carbonate. A most preferred composition is 70 parts PHPVA, 20 parts potassium silicate, and 10 parts potassium carbonate.

The ingredients that make up the compositions useful in this invention may be introduced into the stabilizing fluid in a variety of ways. For example, they may be combined by simple blending to form an additive mixture, commonly referred to as a pre-mix, for later incorporation into the fluid, or each ingredient may be added separately as the fluid is being prepared, with order of addition being discretionary.

THE STABILIZING PROCESS

The preferred embodiment of the process of the invention, using any suitable stabilizing fluid as described above, will be described in the context of treatment of a cased and cemented well extending into an unstable or loosely consolidated sandstone formation containing a large amount of fine siliceous material which would, in the absence of the process of the invention, at least partially fill perforation tunnels with permeability damaging silt before gravel could be packed into the tunnels. In the normal gravel pack completion process, the casing and cement adjacent the potentially hydrocarbon-producing formation is perforated, and the perforations extend a distance into the formation, creating perforation tunnels. A gravel pack screen on the end of a production tubing string is then positioned in the wellbore adjacent the formation, and the annulus between the gravel pack screen and the casing is packed with gravel. The gravel ideally also fills the perforation tunnels during this step.

In accordance with the most preferred embodiment of the invention, a stabilizing fluid, as previously described, is spotted in the wellbore zone to be perforated. As or immediately after the perforation tunnels are formed, this stabilizing fluid contacts the tunnel surfaces and preferably is squeezed into the formation through the tunnel surfaces to stabilize the tunnel and near-tunnel areas against production of silt and/or unconsolidated sand until the tunnels can be filled with gravel from the gravel packing step. After the gravel pack is placed in the wellbore and in the tunnels, the well is produced in a normal manner and the combination of gravel in the tunnels and a stabilized area around the tunnel surfaces acts to prevent movement of silt with produced fluids and provides improved production flow for the well.

The above-described procedure could be varied by contacting the potential production zone with stabilizing fluid prior to the cementing step, but this would present operating difficulties in requiring cleaning of a mud cake from the borehole wall.

In its broader aspects, the invention could be applied to an open hole gravel pack completion, but such completions are relatively rare, particularly where unconsolidated formations are involved.

In another variation of the preferred embodiment, a flushing fluid substantially free of divalent ions can be spotted adjacent the perforation zone and can be displaced into the formation ahead of the stabilizing fluid to prevent divalent ions in the formation fluid from forming precipitates on contact with the stabilizing fluid.

I claim:

1. In a method of gravel packing a well in a potentially hydrocarbon-producing subterranean formation penetrated by a wellbore wherein perforations created by a perforating step extend from said wellbore into said formation and wherein gravel is packed into said well in the zone adjacent said formation and outside a production tubing section extending therethrough and said gravel is also packed into said perforations, the improvement comprising:
   (a) after drilling said wellbore and prior to cementing casing adjacent said potential hydrocarbon-producing formation, forcing a fluid substantially free of divalent ions into said formation to flush formation fluids away from the surface of said borehole;
   (b) injecting a stabilizing fluid containing (1) one or more water-soluble high molecular weight polyfunctional polymers capable of forming several nucleophilic sites when treated with base and (2) one or more potassium salts whose anions are Bronsted-Lowry bases of sufficient strength to raise the pH of the stabilizing fluid to above 9.0 but which are relatively weak nucleophiles compared to the nucleophilic sites of the polymers, said polymers and said salts being present in an amount sufficient to stabilize the surfaces of said perforations until said perforations are packed with gravel into said formation;
   (c) cementing a casing in said wellbore adjacent said potential hydrocarbon-producing formation;
   (d) perforating said casing, cement, and formation; and,
   (e) packing gravel into said zone adjacent said formation.

2. The method of claim 1 wherein said polymers and said potassium salts are present in said fluid in a polymer:potassium salt weight ratio between 1:20 and 3:1.

3. The method of claim 1 wherein said polymers and said potassium salts are present in said fluid in a polymer:potassium salt weight ratio between 1:2 and 2:1.

4. The method of claim 1 wherein said polymer is partially hydrolyzed polyvinyl acetate.

5. The method of claim 1 wherein said stabilizing fluid is an aqueous solution containing between 0.3 and 2.0 weight percent based on the weight of the aqueous phase of said polymers and potassium salts.

6. The method of claim 1 wherein said potassium salts comprises a mixture of potassium silicate and potassium carbonate.

7. The method of claim 6 wherein said stabilizing fluid contains a polymer/salt composition in an amount of from 0.3 to 2.0 weight percent and consisting essentially of 70 parts partially hydrolyzed polyvinyl acetate, 20 parts potassium silicate, and 10 parts potassium carbonate.

8. In a method of gravel packing a well in a potentially hydrocarbon-producing subterranean formation penetrated by a wellbore wherein perforations created by a perforating step extend from said wellbore into said formation and wherein gravel is packed into said well in the zone adjacent said formation and outside a production tubing section extending therethrough and said gravel is also packed into said perforations, the improvement comprising:
   (a) prior to producing hydrocarbons from said formation, forcing a fluid substantially free of divalent ions into the perforation zone of said formation to flush divalent ions therefrom; and
   (b) after step (a) and prior to producing hydrocarbons from said formation, contacting the surfaces of said perforations with a stabilizing fluid containing (1) one or more water-soluble high molecular weight polyfunction polymers capable of forming several nucleophilic sites when treated with base and (2) one or more potassium salts whose anions are Bronsted-Lowry bases of sufficient strength to raise the pH of the stabilizing fluid to above 9.0 but which are relatively weak nucleophiles compared to the nucleophilic sites of the polymers, said polymers and said salts being present in an amount sufficient to stabilize the surfaces of said perforations until said perforations are packed with gravel.

* * * * *